July 3, 1945.　　　　　J. HOHL　　　　　2,379,713
ARTICLE CONVEYING APPARATUS
Filed March 10, 1943　　　2 Sheets-Sheet 1
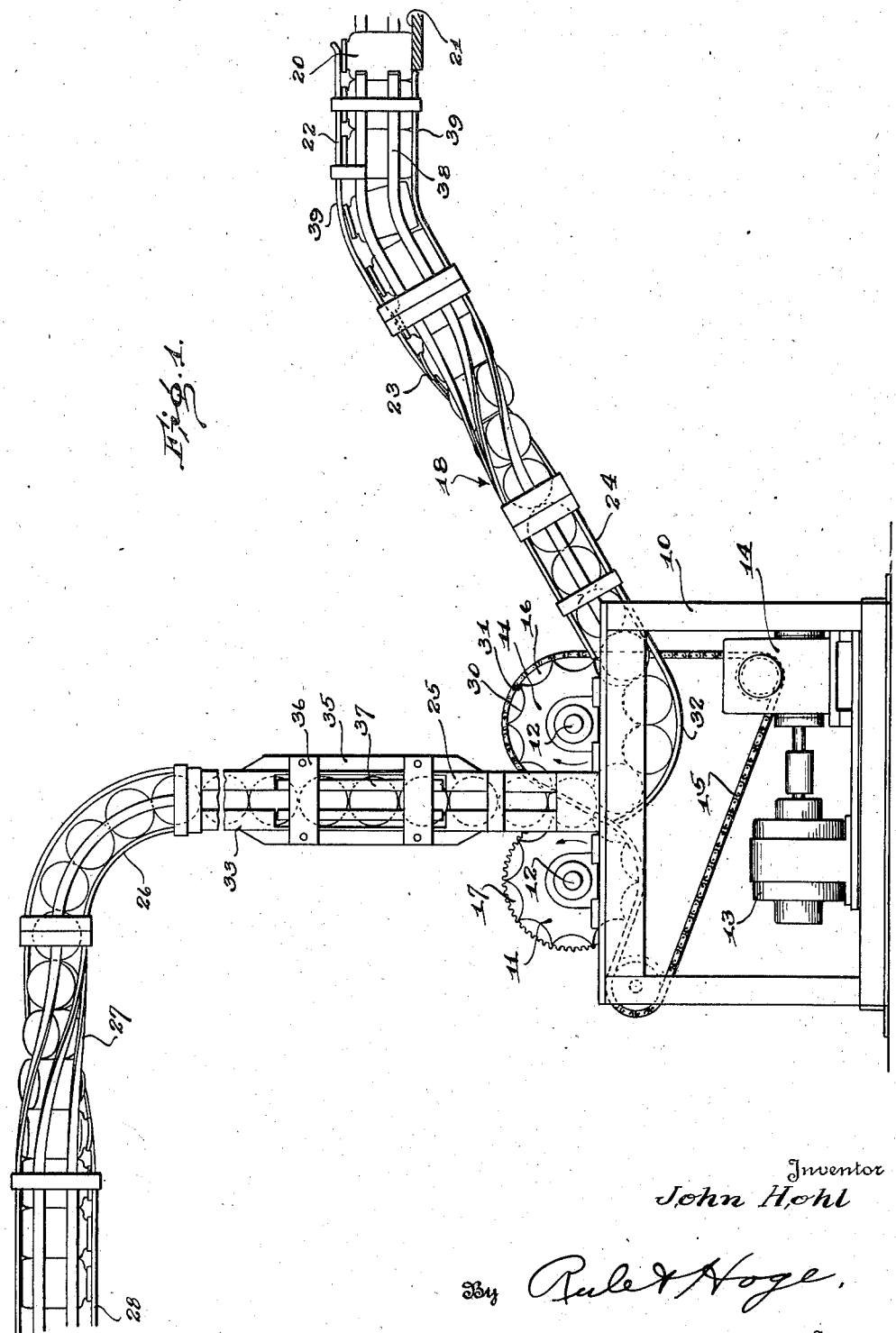
Inventor
John Hohl
By Rule & Hoge,
Attorneys

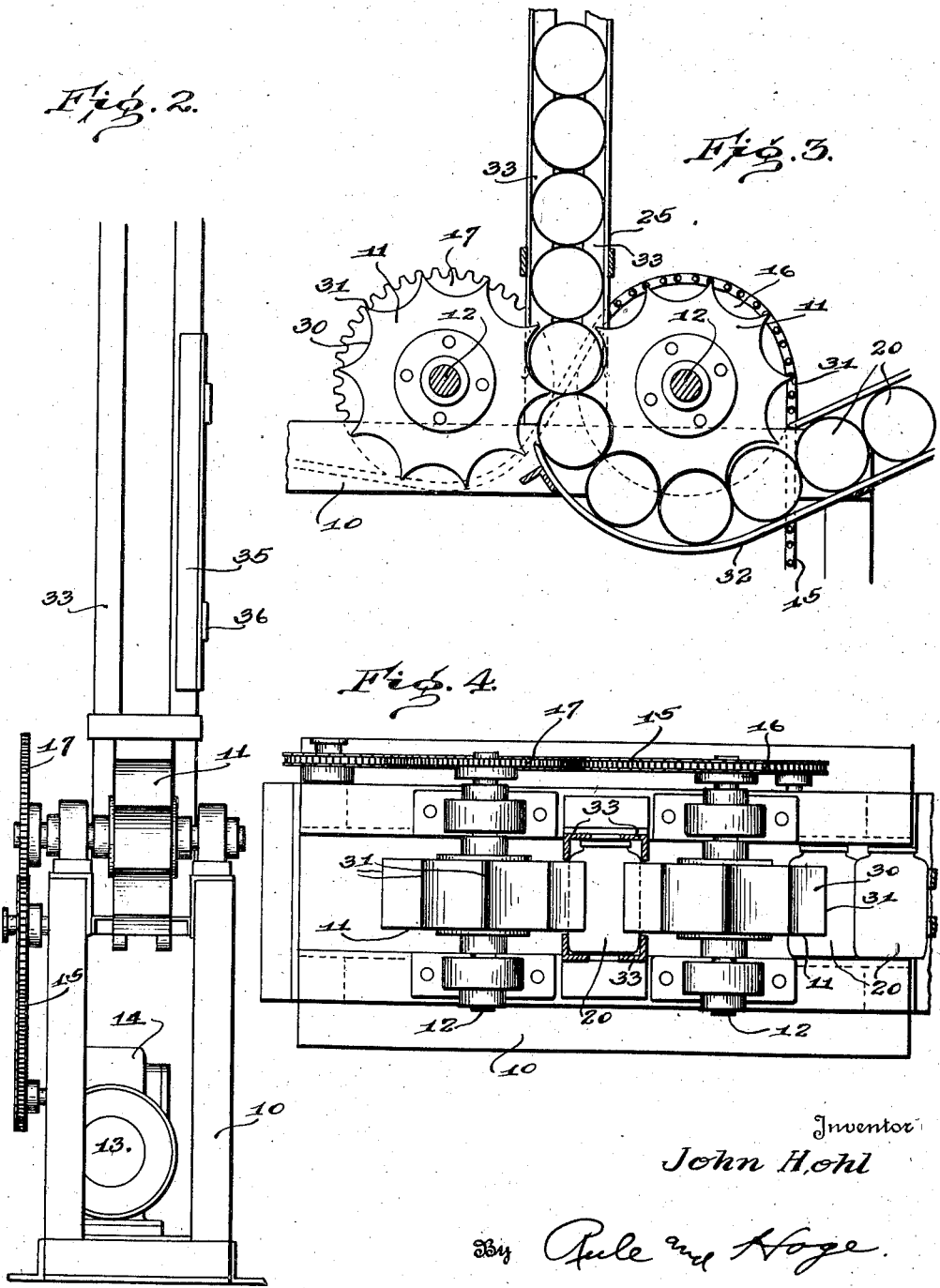

Patented July 3, 1945

2,379,713

UNITED STATES PATENT OFFICE 2,379,713

ARTICLE CONVEYING APPARATUS

John Hohl, Toledo, Ohio, assignor to Owens-Illinois Glass Company, a corporation of Ohio Application March 10, 1943, Serial No. 478,623

6 Claims. (Cl. 198—46)

My invention relates to apparatus for conveying or transferring articles from one position to another and including means for lowering and elevating the articles from one level to another during the transfer.

An object of the invention is to provide a novel transfer apparatus in which the articles during the transfer are retained in an unbroken line, together with means for positively advancing the articles and for accurately controlling their positions during the transfer. The invention provides an apparatus well adapted for handling or transferring glass articles, such as jars and the like, which are subject to breakage and which cannot be satisfactorily handled with apparatus in common use for transferring metal cans and the like which do not require such careful handling.

A further object of the invention is to provide a novel apparatus operable positively for elevating and conveying jars or the like, fed thereto in a continuous unbroken line or row.

Other objects of the invention will appear hereinafter.

Referring to the accompanying drawings:

Fig. 1 is a front elevation of an apparatus embodying the present invention in a form particularly adapted for conveying and elevating round or cylindrical articles such as round glass jars.

Fig. 2 is an end elevation of the apparatus.

Fig. 3 is a sectional elevation showing the pair of lifting wheels and their driving mechanism.

Fig. 4 is a part-sectional plan view of the parts shown in Fig. 3.

Referring particularly to Fig. 1 the apparatus comprises, in general terms, a supporting frame 10, a pair of driving elements 11 in the form of star wheels mounted on shafts 12, journalled in bearings on the frame 10, an electric motor 13 mounted in the frame and having driving connections with the star wheels through speed reduction gearing within a gear box 14, an endless sprocket chain 15 trained over sprocket wheels 16 and 17 keyed to the shafts 12, and a runway 18 through which the articles are guided to and from the driving elements 11.

The articles 20, herein shown as jars of conventional form having cylindrical or round bodies, are placed in upright position on a table or platform 21 at the receiving end of the runway 18. The latter comprises a receiving section 22 which, as shown, includes a horizontal receiving end portion, the opposite end portion being downwardly inclined and connecting with an inclined section 23. The walls of the section 23 are spirally curved or twisted to swing the jars, as they move through said section, to a recumbent position in which their axes extend horizontally. The lower end of the section 23 joins a lower section 24 shaped and arranged to guide jars beneath one of the star wheels 11 and upwardly between the star wheels. The jars are lifted by said star wheels into and through a vertical elevator section 25 and advanced through a curved section 26 to a horizontal section 27. The latter is spirally twisted to swing the jars from a horizontal to an inverted position with their axes vertical, which position is retained as they advance through a horizontal section 28.

The lifting elements 11 are in the form of star wheels having convex peripheral surfaces 30, the edges of adjoining surfaces 30 meeting in lines 31. The surfaces 30 are arc shaped, the radius of curvature being substantially equal to that of the jars 20. The section 24 of the chute comprises bottom supporting rails having curved portions 32, which extend beneath the wheel 11 concentrically therewith and spaced therefrom to a sufficient distance to accommodate the jars and hold them up to the star wheel as they advance. The arrangement is such that the jars are maintained in contact with each other in an unbroken row as they pass around the star wheel. The two star wheels are the same shape and are spaced apart a sufficient distance to permit the passage of the jars therebetween without allowing any substantal sidewise movement of the jars. In this manner the path of the jars is accurately determined and their movement positively controlled as they are delivered to the elevator section 25. The latter comprises vertical angle rails 33 at its four corners to engage the sides and ends of the jars.

The elevator section 25 of the runway includes a removable gate comprising vertical side rails 35 connected by cross bars 36, and upright strips 37 connected to the cross bars. Removal of the gate gives access to the jars as may be necessary or desirable at times, as for example, where breakage occurs.

The runway 18 in its general construction comprises guide strips 38 arranged to engage the side surfaces of the jars, and rails 39 positioned and arranged to engage the ends of the jars. The guide rails in the section 27 are curved spirally or twisted in a manner to swing the bottles from a horizontal to an inverted position.

Modifications may be resorted to within the spirit and scope of my invention.

I claim:
1. Article conveying and elevating apparatus comprising a runway through which the articles are conveyed in an unbroken line, a pair of driving wheels mounted for rotation about horizontal axes and positioned on opposite sides of the runway, said runway including an elevator section having its lower end between said wheels and providing a passageway extending upwardly from the wheels, said wheels being formed with concave surfaces brought in pairs into position to engage opposite sides of articles moving through the runway and forming pockets to receive the articles as they pass between said wheels, said runway including a downwardly and forwardly inclined section extending to one wheel at the side thereof opposite to the elevator section and through which the articles are guided to said side of the wheel, and a curved guide at the lower end of said inclined section and forming an extension thereof, said guide being curved in an arc concentric with the adjacent wheel and spaced therebeneath and providing therewith a passageway through which the articles are guided by the wheel, said guide being positioned to retain the articles in contact with the wheel during their passage along said guide, with said articles held in contact with each other in an unbroken line while passing around the lower portion of the wheel and upwardly to the said elevator section.

2. Article conveying and elevating apparatus comprising a runway through which the articles are conveyed in an unbroken line, a pair of driving wheels mounted for rotation about horizontal axes and positioned on opposite sides of the runway, said runway including an elevator section having its lower end between said wheels and providing a passageway extending upwardly from the wheels, said wheels being formed with concave surfaces brought in pairs into position to engage opposite sides of articles moving through the runway and forming pockets to receive the articles as they pass between said wheels, said runway including a downwardly and forwardly inclined section extending to one wheel at the side thereof opposite to the elevator section and through which the articles are guided to said side of the wheel, and a curved guide at the lower end of said inclined section and forming an extension thereof, said guide being curved in an arc concentric with the adjacent wheel and spaced therebeneath and providing therewith a passageway through which the articles are guided by the wheel, said guide being positioned to retain the articles in contact with the wheel during their passage along said guide, with said articles held in contact with each other in an unbroken line while passing around the lower portion of the wheel and upwardly to the said elevator section, said pairs of concave surfaces forming arcs of circles, the diameters of which are substantially equal to the width of said passageway.

3. Article conveying apparatus comprising a runway through which articles are directed, a pair of star wheels positioned at opposite sides of the runway and mounted for rotation about horizontal axes, and means for rotating said star wheels in synchronism and in opposite directions, said runway including an elevator section extending upwardly from the star wheels through which the articles are lifted by said wheels, said runway also including a section extending downwardly to the outer side of one said wheel and thence in an arc concentric with and extending beneath the wheel in position to provide a passageway through which the articles are driven by said one wheel and carried upwardly into position between the two wheels.

4. Article conveying apparatus comprising a runway through which articles are directed, a pair of star wheels positioned at opposite sides of the runway and mounted for rotation about horizontal axes, and means for rotating said star wheels in synchronism and in opposite directions, said runway including a horizontally disposed receiving section, an inclined section extending downwardly to the outer side of one wheel, a section forming a continuation of said inclined section and curved beneath said one wheel and arranged to direct the articles around the lower portion of said wheel to a position between the wheels, a section extending upwardly from the wheels, and a curved section through which the articles are guided into a horizontal path.

5. Article conveying apparatus comprising a runway through which articles are directed, a pair of star wheels positioned at opposite sides of the runway and mounted for rotation about horizontal axes, and means for rotating said star wheels in synchronism and in opposite directions, said runway including a horizontally disposed receiving section, a downwardly inclined section extending to the outer side of one of said wheels, a curved section extending along the lower peripheral surface of said last mentioned wheel and concentrically therewith and spaced therefrom a distance corresponding to the width of the runway with said curved section in position to hold the article in contact with the wheel throughout their traveling along said curved section and to direct the articles between the wheels, a section extending upwardly from said wheels, a curved section through which the articles are guided into a horizontal path, said runway being shaped at its receiving end to support and guide articles placed in upright position therein, said inclined section being spirally twisted to swing the articles to a position in which their axes are horizontal as the articles approach the driving wheels, and said runway including a section beyond the delivery side of said wheels having its guiding surfaces spirally twisted or curved to swing the articles to an inverted position with their axes vertical.

6. Article conveying and elevating apparatus comprising a pair of driving wheels mounted for rotation about parallel, horizontal axes, a runway comprising an elevator section extending upwardly from said wheels and having its lower end between the wheels, and through which section the articles are elevated by the wheels, and a downwardly inclined section through which the articles are directed toward the wheels, said inclined section having its lower end portion at the outer side of one said wheel, means providing a curved guide extending concentrically with and spaced below the lower portion of said last mentioned wheel and forming therewith a guideway through which the articles are directed, said wheels being formed with concave peripheral surfaces brought in pairs into position to engage opposite sides of circular articles moving through the runway and forming pockets to receive the articles as they pass between said wheels, said curved guideway being of sufficient length and positioned to simultaneously hold a plurality of the articles in contact with the said wheel and in position to be driven thereby while the articles are passing from one said section of the runway to the other.

JOHN HOHL.